(12) United States Patent  
Li (10) Patent No.: US 12,279,063 B2
(45) Date of Patent: Apr. 15, 2025

(54) SYNCHRONOUS RENDERING METHOD, ELECTRONIC DEVICE, AND STORAGE MEDIUM

(71) Applicant: Ruijie Network Suzhou Co., Ltd, Jiangsu (CN)

(72) Inventor: Guang Li, Jiangsu (CN)

(73) Assignee: Ruijie Network Suzhou Co., Ltd, Jiangsu (CN)

( * ) Notice: Subject to any disclaimer, the term of this patent is extended or adjusted under 35 U.S.C. 154(b) by 0 days.

(21) Appl. No.: 18/764,171

(22) Filed: Jul. 4, 2024

(65) Prior Publication Data

US 2024/0364838 A1 Oct. 31, 2024

Related U.S. Application Data

(63) Continuation of application No. PCT/CN2023/143591, filed on Dec. 29, 2023.

(30) Foreign Application Priority Data

Dec. 29, 2022 (CN) .......................... 202211708109.1

(51) Int. Cl.
*G06T 1/20* (2006.01)
*H04N 5/04* (2006.01)

(52) U.S. Cl.
CPC .................. *H04N 5/04* (2013.01); *G06T 1/20* (2013.01)

(58) Field of Classification Search
CPC ......... G06T 1/20; G06T 15/00; G06T 15/005; G06F 9/46; H04N 5/04
See application file for complete search history.

(56) References Cited

U.S. PATENT DOCUMENTS 8,493,399 B1   7/2013  Bates et al.
8,736,625 B2 * 5/2014  Swift .................... G09G 5/001
                                                    345/522

(Continued)

FOREIGN PATENT DOCUMENTS

CN    101080698    11/2007
CN    115205096    10/2022
WO    2022127890    6/2022

OTHER PUBLICATIONS

"International Search Report (Form PCT/ISA/210) of PCT/CN2023/143591," mailed on Apr. 1, 2024, with English translation thereof, pp. 1-6.

(Continued)

*Primary Examiner* — Phi Hoang
(74) *Attorney, Agent, or Firm* — JCIPRNET (57) ABSTRACT

This application discloses a synchronous rendering method, a device, and a storage medium. The method includes: determining, by a virtual graphics processing driver based on a second synchronization flag bit of a synchronization signal, whether to generate a rendering frame; after the rendering frame is generated, setting a first synchronization flag bit and the second synchronization flag bit of the synchronization signal to indicate that the rendering frame has been generated; obtaining, by a virtual graphics processing unit, the rendering frame and the synchronization signal, and determining, based on the first synchronization flag bit, whether to render the rendering frame; and after the rendering frame is rendered, setting the first synchronization flag bit and the second synchronization flag bit to indicate that the rendering frame has been rendered.

18 Claims, 7 Drawing Sheets

(56) References Cited

U.S. PATENT DOCUMENTS

2009/0028448 A1* 1/2009 Collomosse ......... G09G 3/2022
                                              382/232
2011/0090234 A1* 4/2011 Bolcsfoldi ................ G09F 9/35
                                              345/536
2019/0279592 A1* 9/2019 Colenbrander ........... G06F 3/14
2021/0383596 A1* 12/2021 Chan ........................ G09G 5/14
2022/0013087 A1* 1/2022 Marchya ................ G09G 5/363
2022/0156877 A1 5/2022 Kim et al.
2023/0298524 A1* 9/2023 Cho ..................... G09G 3/3233
                                              345/691

OTHER PUBLICATIONS

"Written Opinion of the International Searching Authority (Form PCT/ISA/237) of PCT/CN2023/143591," mailed on Apr. 1, 2024, with English translation thereof, pp. 1-6.

\* cited by examiner

SYNCHRONOUS RENDERING METHOD, ELECTRONIC DEVICE, AND STORAGE MEDIUM

CROSS-REFERENCE TO RELATED APPLICATIONS

This application is a continuation of PCT application No. PCT/CN2023/143591, filed on Dec. 29, 2023 and entitled "SYNCHRONOUS RENDERING METHOD AND APPARATUS", which claims priority to Chinese Patent Application No. 202211708109.1, filed with the China National Intellectual Property Administration on Dec. 29, 2022 and entitled "SYNCHRONOUS RENDERING METHOD AND APPARATUS", both of which are incorporated herein by reference in their entireties.

TECHNICAL FIELD

Embodiments of this application relate to the field of computer virtualization technologies, and in particular, to a synchronous rendering method, an electronic device, and a storage medium.

BACKGROUND

Currently, a virtual graphics processing unit (vGPU) may be implemented through three basic technical paths: hardware-level single root input/output virtualization (SRIOV), a hardware multiplexing-level mdev driver, and software-only virtualization. Usually, any virtualization technology requires a complete vGPU driver. With a vGPU, a virtual machine runs a guest system through a virtual central processing unit (vCPU), and realizes a rendering function interface based on a vGPU driver of the guest system, to realize rendering function management, implement a specific rendering function, and submit a rendering task to the vGPU. The vGPU driver and the vGPU need to be synchronized with each other in a specified interrupt manner during interaction for each frame of data. The rendering is completed jointly by vGPU driver and the vGPU in the virtual machine.

A processing method for a rendering synchronization mechanism is usually as follows: According to a requirement of a Windows display driver model (WDDM) and direct rendering infrastructure (DRI) rendering framework, a rendering synchronization frame (fence) is inserted after each frame of rendering command is submitted, and a virtual machine interrupt is triggered. Synchronous rendering between the vGPU driver and the vGPU is performed during the interrupt. The interrupt mechanism can prevent the vGPU driver from generating a new rendering command before the synchronous rendering is completed, to avoid a rendering conflict.

SUMMARY

Embodiments of this application provide a synchronous rendering method, an electronic device, and a storage medium.

According to a first aspect, an exemplary embodiment of this application provides a synchronous rendering method, including:

obtaining a value of a first synchronization flag bit and a value of a second synchronization flag bit, where the first synchronization flag bit indicates whether synchronous rendering is completed, and the second synchronization flag bit indicates whether a rendering frame that has not been synchronously rendered exists; when the value of the first synchronization flag bit is a first value, generating a first rendering frame, and setting the value of the second synchronization flag bit to a second value; and when the value of the second synchronization flag bit is the second value, synchronously rendering the first rendering frame, and setting the value of the first synchronization flag bit to the first value after the synchronous rendering is completed.

In this embodiment, when the value of the first synchronization flag bit is the first value, a first device may generate the first rendering frame, and set the value of the second synchronization flag bit to the second value. In addition, when the value of the second synchronization flag bit is the second value, the first device may perform synchronous rendering, and set the value of the first synchronization flag bit to the first value after the synchronous rendering is completed. Therefore, the first device can be prevented from generating a new rendering frame when the synchronous rendering has not been completed, to avoid a rendering error. In this process, the first device only needs to read the values of the first synchronization flag bit and the second synchronization flag bit without executing an interrupt. Therefore, usage of CPU resources during synchronous rendering can be reduced, to improve rendering efficiency.

In an embodiment, the method further includes stopping generating a rendering frame when the value of the first synchronization flag bit is not the first value.

According to the method, when the value of the first synchronization flag bit is not the first value, a virtual machine may stop generating a rendering frame. After synchronization of a previous rendering frame is completed, that is, after the value of the first synchronization flag bit is set to the first value, a new rendering frame may be generated. Therefore, a delay mechanism for generating a rendering frame is implemented. This can avoid a synchronous rendering conflict.

In an embodiment, after the generating a first rendering frame, the method further includes: setting the value of the first synchronization flag bit not to be the first value.

According to the method, the value of the first synchronization flag bit may be set not to be the first value after the first rendering frame is generated, to avoid generating a new first rendering frame because the value of the first synchronization flag bit is not changed in a case in which synchronous rendering has not been completed. Therefore, a synchronous rendering conflict can be avoided.

In an embodiment, the method further includes: when the value of the second synchronization flag bit is not the second value, stopping performing synchronous rendering based on a generated rendering frame.

According to the method, a value of the second synchronization flag bit may be set to indicate an execution process of parsing a rendering frame. The virtual machine may stop synchronous rendering or perform another task based on the second synchronization flag bit, to avoid repeated rendering when no new rendering frame that needs to be synchronized is generated, and reduce a waste of resources. Optionally, the first device may not have to end a rendering task.

In an embodiment, after the synchronously rendering the first rendering frame, the method further includes: setting the value of the second synchronization flag bit not to be the second value.

According to the method, the value of the second synchronization flag bit may be set to a value other than the second value after synchronous rendering is performed, to avoid repeatedly performing synchronous rendering based on the first rendering frame because the value of the second synchronization flag bit is not changed in a case in which no new rendering frame is generated.

According to a second aspect, an exemplary embodiment of this application further provides a synchronous rendering apparatus, including an obtaining module and a processing module.

The obtaining module is configured to obtain a value of a first synchronization flag bit and a value of a second synchronization flag bit, where the first synchronization flag bit indicates whether synchronous rendering is completed, and the second synchronization flag bit indicates whether a rendering frame that has not been synchronously rendered exists. The processing module is configured to: when the value of the first synchronization flag bit is a first value, generate a first rendering frame, and set the value of the second synchronization flag bit to a second value; and when the value of the second synchronization flag bit is the second value, synchronously render the first rendering frame, and set the value of the first synchronization flag bit to the first value after the synchronous rendering is completed.

In an embodiment, the processing module is further configured to stop generating a rendering frame when the value of the first synchronization flag bit is not the first value.

In an embodiment, after generating the first rendering frame, the processing module is further configured to set the value of the first synchronization flag bit not to be the first value.

In an embodiment, the processing module is further configured to: when the value of the second synchronization flag bit is not the second value, stop performing synchronous rendering based on a generated rendering frame.

In an embodiment, after synchronously rendering the first rendering frame, the processing module is further configured to set the value of the second synchronization flag bit not to be the second value.

According to a third aspect, an exemplary embodiment of this application provides a synchronous rendering method, including: determining, by a virtual graphics processing driver based on a second synchronization flag bit of a synchronization signal, whether to generate a rendering frame; after the rendering frame is generated, setting a first synchronization flag bit and the second synchronization flag bit of the synchronization signal to indicate that the rendering frame has been generated; obtaining, by a virtual graphics processing unit, the rendering frame and the synchronization signal, and determining, based on the first synchronization flag bit, whether to render the rendering frame; and after the rendering frame is rendered, setting the first synchronization flag bit and the second synchronization flag bit to indicate that the rendering frame has been rendered.

In this embodiment, the first synchronization flag bit and the second synchronization flag bit in the synchronization signal are set based on generation of a rendering frame and rendering of the rendering frame, and synchronization between the virtual graphics processing driver and the virtual graphics processing unit (also referred to as a virtual graphics processing unit device) is ensured based on the settings of the first synchronization flag bit and the second synchronization flag bit. This avoids that an interrupt wait of the virtual machine has to be proceeded for synchronization between the virtual graphics processing driver and the virtual graphics processing unit, and synchronization between the virtual graphics processing driver and the virtual graphics processing unit can be implemented by reading and writing the value of the first synchronization flag bit and the second synchronization flag bit. This reduces usage of CPU resources during synchronous rendering.

In an embodiment, before the determining, by a virtual graphics processing driver based on a second synchronization flag bit of a synchronization signal, whether to generate a rendering frame, the method further includes: setting the second synchronization flag bit to a first value; and the determining, by a virtual graphics processing driver based on a second synchronization flag bit of a synchronization signal, whether to generate a rendering frame includes: when the second synchronization flag bit is the first value, generating the rendering frame.

In an embodiment, the determining, by a virtual graphics processing driver based on a second synchronization flag bit of a synchronization signal, whether to generate a rendering frame further includes: when the second synchronization flag bit is the second value, entering, by the virtual graphics processing driver, a sleep state, or processing another task.

In an embodiment, the determining, by a virtual graphics processing driver based on a second synchronization flag bit of a synchronization signal, whether to generate a rendering frame further includes: when the second synchronization flag bit is the second value, detecting, by the virtual graphics processing driver, the second synchronization flag bit of the synchronization signal.

In this embodiment, when the second synchronization flag bit is the second value, the virtual graphics processing driver does not generate a rendering frame. In this case, the virtual graphics processing driver may detect the second synchronization flag bit to ensure that a rendering frame is generated when the second synchronization flag bit changes to the first value. In this way, the virtual graphics processing driver can enter a sleep state or process another task when stopping generating a rendering frame.

In an embodiment, the after the rendering frame is generated, setting a first synchronization flag bit and the second synchronization flag bit of the synchronization signal to indicate that the rendering frame has been generated includes: after the rendering frame is generated, setting the second synchronization flag bit to a second value, and setting the first synchronization flag bit to a fourth value.

In an embodiment, before the determining, by a virtual graphics processing driver based on a second synchronization flag bit of a synchronization signal, whether to generate a rendering frame, the method further includes: setting the first synchronization flag bit to a third value; and the method further includes: after the rendering frame is generated, setting the first synchronization flag bit to a fourth value.

In an embodiment, the determining, by a virtual graphics processing unit based on the first synchronization flag bit of the synchronization signal, whether to render the rendering frame includes: rendering the rendering frame when the first synchronization flag bit is the fourth value.

In an embodiment, the after the rendering frame is rendered, setting the first synchronization flag bit and the second synchronization flag bit to indicate that the rendering frame has been rendered includes: setting the first synchronization flag bit to the third value, and setting the second synchronization flag bit to the first value.

In an embodiment, the determining, by a virtual graphics processing unit based on the first synchronization flag bit of the synchronization signal, whether to render the rendering frame further includes: when the first synchronization flag bit is the third value, entering, by the virtual graphics processing unit, a sleep state, or processing another task.

In an embodiment, the determining, by a virtual graphics processing unit based on the first synchronization flag bit of the synchronization signal, whether to render the rendering frame further includes: when the first synchronization flag bit is the third value, detecting, by the virtual graphics processing unit, the first synchronization flag bit of the synchronization signal.

In this embodiment, when the first synchronization flag bit is the third value, the virtual graphics processing unit does not start rendering of the rendering frame. In this case, the virtual graphics processing unit may detect the first synchronization flag bit to ensure that rendering of the rendering frame is started when the first synchronization flag bit changes to the fourth value. In this way, the virtual graphics processing unit can enter a sleep state or process another task when stopping rendering the rendering frame.

In an embodiment, the rendering the rendering frame when the first synchronization flag bit is the fourth value includes: parsing the rendering frame; and sending the rendering frame to a physical graphics processing unit for rendering.

In an embodiment, before the sending the rendering frame to a physical graphics processing unit for rendering, the rendering the rendering frame when the first synchronization flag bit is the fourth value further includes: determining whether the physical graphics processing unit is idle; and the sending the rendering frame to a physical graphics processing unit for rendering includes: when the physical graphics processing unit is idle, sending the rendering frame to the physical graphics processing unit for rendering.

In an embodiment, when the physical graphics processing unit is not idle, the virtual graphics processing unit detects the first synchronization flag bit.

In this embodiment, when the physical graphics processing unit is rendering a rendering frame, the virtual graphics processing unit temporarily does not send the rendering frame to the physical graphics processing unit, but continuously detects the first synchronization flag bit. When the first synchronization flag bit is the third value, the virtual graphics processing unit stops sending the rendering frame to the physical graphics processing unit. When the first synchronization flag bit is the fourth value, the virtual graphics processing unit attempts to send the rendering frame to the physical graphics processing unit again. This can ensure synchronization between generation of a rendering frame and rendering of the rendering frame in real time even if the physical graphics processing unit is not idle.

In an embodiment, the synchronization signal does not include a rendering synchronization frame.

The fact that the synchronization signal does not include a rendering synchronization frame means that the synchronization signal may not include a rendering synchronization frame (fence) in the conventional technology, but instead, the first synchronization flag bit and the second synchronization flag bit, for example, are used to distinguish between a previous rendering frame and a next rendering frame.

In an embodiment, the synchronization signal includes only the first synchronization flag bit and the second synchronization flag bit.

In this embodiment, the first synchronization flag bit and the second synchronization flag bit are inserted between rendering frames without insertion of an additional rendering synchronization frame (fence). This reduces frame overheads while ensuring synchronization between generation of a rendering frame and rendering of the rendering frame.

In an embodiment, the synchronization signal includes a rendering synchronization frame, and the first synchronization flag bit and the second synchronization flag bit are set at the last two bits of the rendering synchronization frame.

In an embodiment, the first synchronization flag bit is configured to be readable and writable to the virtual graphics processing unit and only readable to the virtual graphics processing driver.

In an embodiment, the second synchronization flag bit is configured to be readable and writable to the virtual graphics processing driver and only readable to the virtual graphics processing unit.

In an embodiment, the first synchronization flag bit and the second synchronization flag bit are able to be set through bit reversal and bit association.

According to a fourth aspect, an exemplary embodiment of this application provides a synchronous rendering apparatus, including: a virtual graphics processing driver, configured to: determine, based on a second synchronization flag bit of a synchronization signal, whether to generate a rendering frame, and after the rendering frame is generated, set a first synchronization flag bit and the second synchronization flag bit of the synchronization signal to indicate that the rendering frame has been generated; and a virtual graphics processing unit, configured to: obtain the rendering frame and the synchronization signal, and after the rendering frame is rendered, set the first synchronization flag bit and the second synchronization flag bit to indicate that the rendering frame has been rendered.

According to a fifth aspect, an exemplary embodiment of this application provides a synchronous rendering method, including: determining, by a virtual graphics processing driver based on a second synchronization flag bit of a synchronization signal, whether to generate a rendering frame; and after the rendering frame is generated, setting a first synchronization flag bit and the second synchronization flag bit of the synchronization signal to indicate that the rendering frame has been generated.

Various exemplary embodiments of the synchronous rendering method are described in the foregoing other exemplary embodiments. Details are not described herein again.

According to a sixth aspect, an exemplary embodiment of this application provides a synchronous rendering method, including: obtaining, by a virtual graphics processing unit, a rendering frame and a synchronization signal, and determining, based on a first synchronization flag bit of the synchronization signal, whether to render the rendering frame; and after the rendering frame is rendered, setting the first synchronization flag bit and a second synchronization flag bit to indicate that the rendering frame has been rendered.

Various exemplary embodiments of the synchronous rendering method are described in the foregoing other exemplary embodiments. Details are not described herein again.

According to a seventh aspect, an exemplary embodiment of this application further provides a computer-readable storage medium. The computer-readable storage medium stores a computer program. When the computer program is executed by a processor, the method according to any one of the first aspect or the designs of the first aspect is implemented.

According to an eighth aspect, an exemplary embodiment of this application further provides an electronic device, including a memory and a processor. The memory stores a computer program capable of running on the processor. When the computer program is executed by the processor, the processor is enabled to implement the method according to any one of the first aspect or the designs of the first aspect.

BRIEF DESCRIPTION OF DRAWINGS

To describe the technical solutions in the embodiments of this application more clearly, the following briefly describes the accompanying drawings for describing the embodiments.

Clearly, the accompanying drawings in the following descriptions show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following optionally describes this application in detail with reference to the accompanying drawings. Clearly, the described embodiments are merely some but not all of the embodiments of this application. All other embodiments obtained by a person of ordinary skill in the art based on embodiments of this application without creative efforts shall fall within the protection scope of this application. It should be understood that a specific operation method in a method embodiment described below may also be used in an apparatus embodiment or a system embodiment.

In the specification, claims, and accompanying drawings of this application, the terms "first" and "second" are used to distinguish between different objects, and not intended to describe a specific order. In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, system, product, or device.

The term "a plurality of" in this application may mean at least two, for example, two, three, or more. However, the embodiments of this application are not limited thereto.

Unless otherwise defined in the context, in this application, a first value may be a true (True) value or a false (False) value, and a second value may be an opposite value of the first value, that is, a false (False) value or a true (True) value. A third value may be a true (True) value or a false (False) value, and a fourth value may be an opposite value of the third value, that is, a false (False) value or a true (True) value.

For example, a first value of a second synchronization flag bit may be 1, and in this case, a second value (non-first-value) may be 0; or the first value of the second synchronization flag bit may be 0, and in this case, the non-first-value may be 1.

Similarly, a third value of a first synchronization flag bit may be 1, and in this case, a fourth value (non-third-value) may be 0; or the third value of the first synchronization flag bit may be 0, and in this case, the fourth value of the first synchronization flag bit may be 1. For example, both the first value and the third value may be 1, or both the first value and the third value may be 0, or the first value and the third value may be different.

As described above, a vGPU driver inserts a synchronization frame after each frame of rendering command is submitted, and triggers a virtual machine interrupt. Synchronous rendering between the vGPU driver and a vGPU is performed during the interrupt. The interrupt mechanism can prevent the vGPU driver from generating a new rendering command before the synchronous rendering is completed, to avoid a rendering conflict. However, interrupts and resumption of the virtual machine occupy central processing unit (CPU) resources.

Currently, a quantity of rendering tasks is enormous, and 10,000 submissions may usually be performed per second. In addition, each rendering task may trigger an interrupt. Therefore, an interrupt-based synchronization process occupies a large quantity of CPU resources, and rendering efficiency of a graphics processing unit (GPU) is reduced due to excessive usage of CPU resources. Therefore, the existing synchronous rendering solution needs to be improved.

Prior to describing a synchronous rendering method provided in the embodiments of this application, the following first describes technical background of the embodiments of this application in detail for ease of understanding.

A graphics rendering support method in a guest system of a virtual machine has been gradually improved in recent years. There may be two processing methods for a rendering synchronization mechanism: 1. According to a requirement of a Windows display driver model (WDDM) and direct rendering infrastructure (DRI) rendering framework, a virtual graphics processing unit (vGPU) driver (or referred to as a guest GPU driver) inserts a synchronization frame (fence) after each frame of rendering command is submitted, and triggers a virtual machine interrupt. After the vGPU driver generates a rendering frame, an interrupt mechanism enables the virtual machine to interrupt operation and wait until a vGPU completes synchronization of rendering. After the vGPU driver and the vGPU complete synchronization of rendering by using the fence, the virtual machine resumes operation, and the vGPU driver generates a next to-be-synchronized rendering frame. Therefore, based on the interrupt mechanism, the vGPU driver can be prevented from generating a new to-be-synchronized rendering frame before the vGPU completes synchronous rendering, to avoid a conflict between two to-be-synchronized rendering frames, and avoid an error during synchronization of a rendering frame. 2. The WDDM and DRI rendering framework is skipped, and a rendering command is directly submitted through API redirection. In the second method, no synchronization issue needs to be considered, but rendering tasks cannot be performed, and a serious functional defect exists. Therefore, the first method is usually used. That is, synchronization is performed by using an interrupt.

Figure 1:
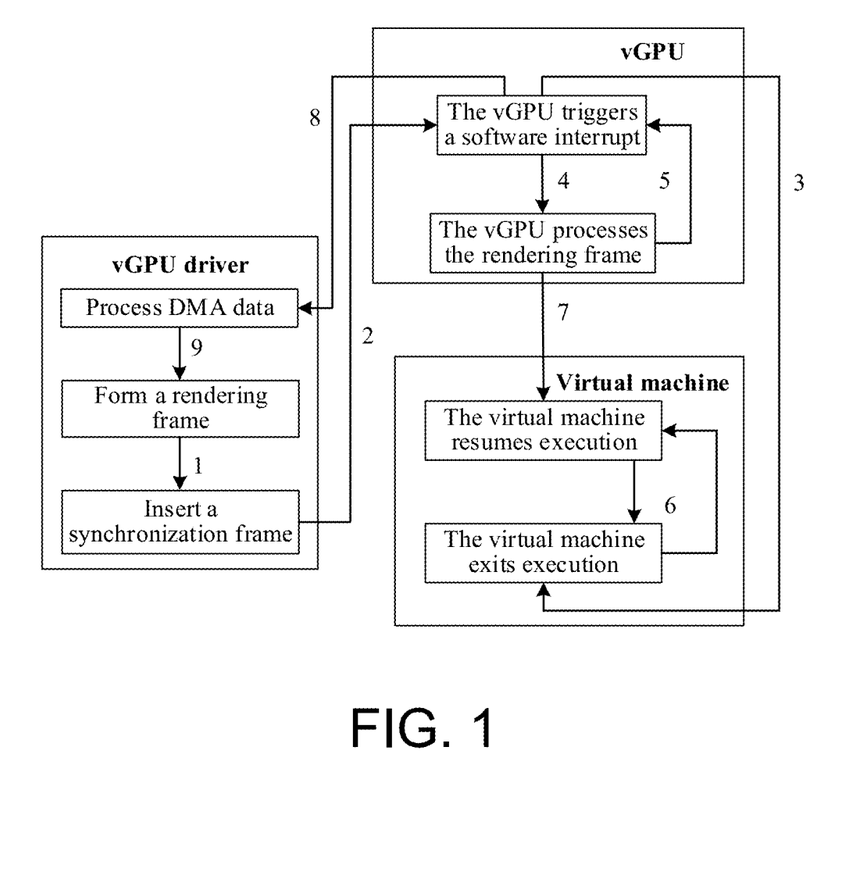
FIG. 1 is a schematic flowchart of a synchronous rendering method in the related art.

FIG. 1 is a schematic flowchart of a synchronous rendering method in the related art. The method includes the following steps.

Step 1: A vGPU driver forms a rendering frame, that is, a command stream and corresponding data.

Step 2: The vGPU driver inserts a rendering synchronization frame (fence).

Step 3: A vGPU triggers a software interrupt.

Step 4: A virtual machine exits execution.

Step 5: The GPU processes the rendering frame.

Step 6: The virtual machines continues to perform another task.

Step 7: The GPU performs writing back to the synchronization fence, and triggers a software interrupt again.

Step 8: The virtual machine exits execution.

Step 9: The driver receives the interrupt and processes DMA data synchronization.

In the related art, after the vGPU driver in the virtual machine generates a rendering frame, a synchronization frame is output along with the rendering frame. The virtual machine triggers an interrupt after receiving the synchronization frame. After the virtual machine triggers the interrupt, the vGPU processes or parses the rendering frame, where the parsing is a process of obtaining the rendering frame and processing the rendering frame by the vGPU. After the vGPU completes parsing the rendering frame, the virtual machine resumes operation. Optionally, a device such as a personal computer (PC) may be considered as a virtual machine.

As described above, a quantity of rendering tasks is enormous, and 10,000 submissions may usually be performed per second. In addition, each rendering task may trigger an interrupt. Therefore, an interrupt-based synchronization process occupies a large quantity of CPU resources, and rendering efficiency of a GPU is reduced due to excessive usage of CPU resources. Therefore, a current synchronous rendering solution needs to be improved.

Exemplary embodiments of this application provide a synchronous rendering method, to reduce usage of CPU resources during synchronous rendering.

It can be understood that the synchronous rendering method provided in this application may be performed by a virtual machine, and specifically, may be performed by, for example, the vGPU and/or the vGPU driver in FIG. 1. According to the method, a first synchronization flag bit is readable and writable to the vGPU, and a second synchronization flag bit is readable to the vGPU; and the second synchronization flag bit is readable and writable to the vGPU driver, and the first synchronization flag bit is readable to the vGPU driver. A value of the first synchronization flag bit may be a first value or a non-first-value, and a value of the second synchronization flag bit may be a second value or a non-second-value. Synchronous rendering between a vGPU driver and a vGPU in a virtual machine can be implemented based on the value of the first synchronization flag bit and the value of the second synchronization flag bit, without interrupting the virtual machine. This reduces usage of CPU resources caused by an interrupt during synchronous rendering.

Figure 2:
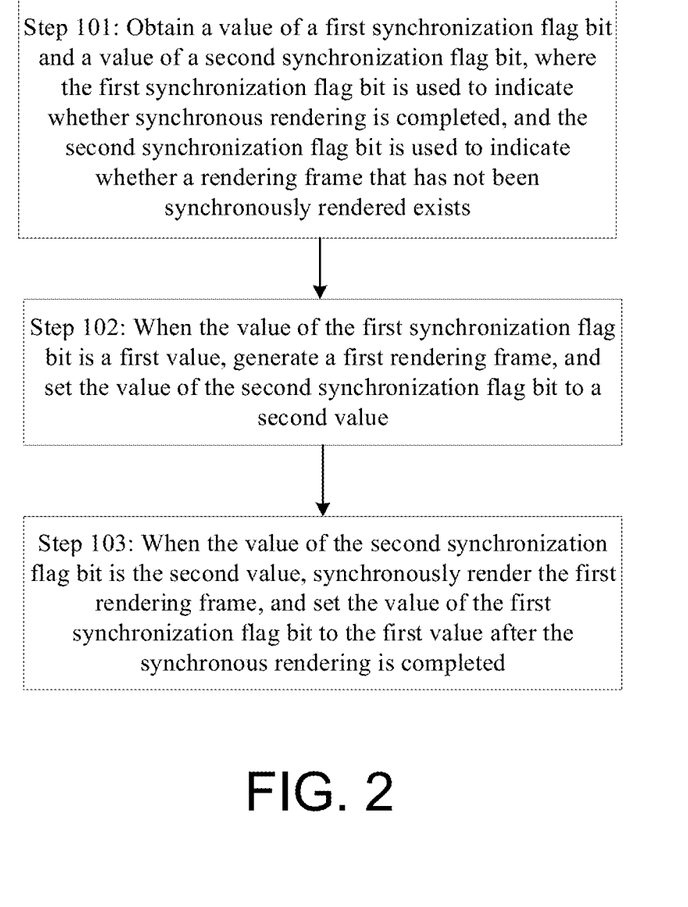
FIG. 2 is a schematic flowchart of a synchronous rendering method according to an embodiment of this application.

As shown in FIG. 2, a synchronous rendering method provided in an embodiment of this application specifically includes the following steps.

Step 101: Obtain a value of a first synchronization flag bit and a value of a second synchronization flag bit, where the first synchronization flag bit indicates whether synchronous rendering is completed, and the second synchronization flag bit indicates whether a rendering frame that has not been synchronously rendered exists.

In a possible embodiment, the rendering method may be performed by a vGPU driver (or referred to as a virtual machine chip driver, for example, a driver in a guest system of a virtual machine) and a vGPU (or referred to as a virtual device or a virtual chip). The vGPU driver and the vGPU exist in a virtual machine. The vGPU driver may generate a rendering frame, and the vGPU may perform synchronous rendering based on the generated rendering frame. The rendering frame is usually a group of commands generated through processing by a GPU driver provided by a graphics rendering program. The rendering frame is used to generate data of a graphics result and control a rendering process.

In a possible embodiment, the rendering frame may be generated in a virtual machine by a driver in a guest system and written to specific memory space. The rendering frame may be rendered by a vGPU device to generate a rendered graphics result. Rendering synchronization runs in a virtual machine, and may be performed between a vGPU device for virtual processing in the virtual machine and a vGPU driver in a guest system running in the virtual machine.

For example, for any GPU from NVIDIA, a vGPU driver is a corresponding GPU driver, and a rendering process is performed by any three-dimensional (3D) drawing program. The GPU driver processes a rendering request, and then compiles the rendering request into a related instruction (namely, a rendering frame) of the GPU and sends the instruction to the GPU, so that the GPU performs rendering according to the instruction, that is, implements synchronous rendering based on the rendering frame.

In a possible embodiment, a synchronization register may exist in the virtual machine. The synchronization register may exist in the virtual machine independent of the vGPU driver and the vGPU. The synchronization register may store a value of a synchronization flag bit. The synchronization flag bit is specific bytes of data in a virtual machine program, and the program includes a program with a graphics display function. The synchronization flag bit includes a first synchronization flag bit and a second synchronization flag bit.

In a possible embodiment, the first synchronization flag bit is a synchronization flag bit that can be set or modified by the vGPU. The vGPU may read only the second synchronization flag bit, and may set or modify the first synchronization flag bit based on the second synchronization flag bit.

In a possible embodiment, the second synchronization flag bit is a synchronization flag bit that can be set or modified by the vGPU driver. The vGPU driver may read only the first synchronization flag bit, and may set or modify the second synchronization flag bit based on the first synchronization flag bit.

In a possible embodiment, an initial true value (or referred to as true) and false value (or referred to as false) may be set in the first synchronization flag bit and/or the second synchronization flag bit. Optionally, the first synchronization flag bit and/or the second synchronization flag bit may be set to a value of the first synchronization flag bit based on the initial true value or set to a value of the second synchronization flag bit based on the initial false value. For example, the true value may be 1, and the false value may be 0.

Figure 3:
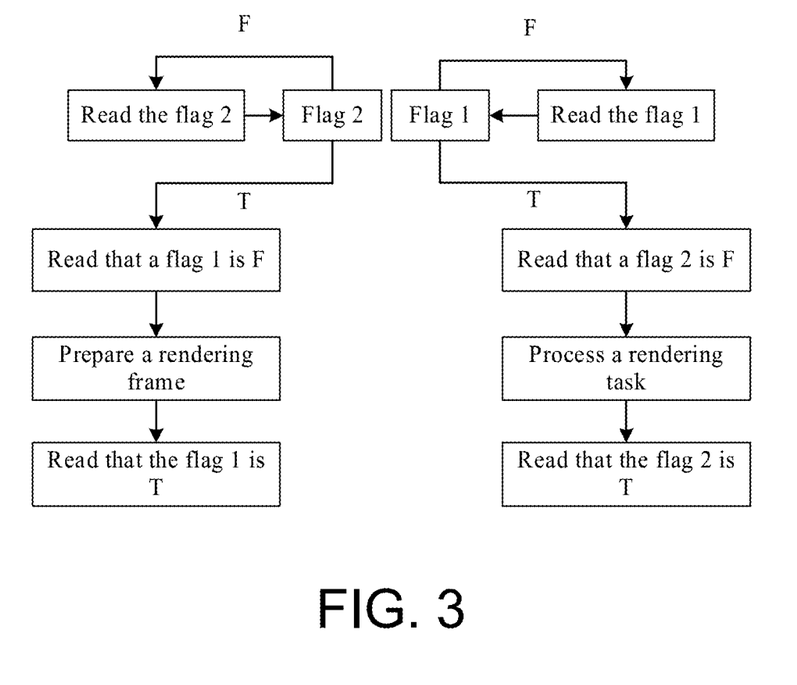
FIG. 3 is a schematic diagram of a process of processing a first synchronization flag bit and a second synchronization flag bit in a synchronous rendering method according to an embodiment of this application.

For example, as shown in FIG. 3, the second synchronization flag bit may be denoted as a flag 1 (or referred to as a flag-g), and the first synchronization flag bit may be denoted as a flag 2 (or referred to as a flag-h).

In FIG. 3, T stands for true, and for example, indicates that a value is 1; and F stands for false, and for example, indicates that a value is 0. Taking FIG. 3 as an example, the value of the first synchronization flag bit being T indicates that synchronous rendering is completed, the value of the first synchronization flag bit being F indicates that synchronous rendering has not been completed. The value of the second synchronization flag bit being T indicates that a rendering frame that has not been synchronously rendered exists, and the value of the second synchronization flag bit being F indicates that no rendering frame that has not been synchronously rendered exists. The following describes functions of the flag 1 and the flag 2 with reference to Step 102 and Step 103, details of which are not described in this context.

Step 102: When the value of the first synchronization flag bit is a first value, generate a first rendering frame, and set the value of the second synchronization flag bit to a second value.

The first value may be a true value or a false value, and the second value may be a true value or a false value. For example, the first value of the first synchronization flag bit may be 1, and in this case, a non-first-value may be 0; or the first value of the first synchronization flag bit may be 0, and in this case, a non-first-value may be 1. The second value of the second synchronization flag bit may be 1, and in this case, a non-second-value may be 0; or the second value of the second synchronization flag bit may be 0, and in this case, a non-second-value of the second synchronization flag bit may be 1. For example, both the first value and the second value may be 1, or both the first value and the second value may be 0, or the first value and the second value may be different.

Step 102 may be performed by the vGPU driver.

In a possible embodiment, the vGPU driver may read the value of the first synchronization flag bit. If the vGPU driver reads that the value of the first synchronization flag bit is the first value, the vGPU driver generates the first rendering frame, and the vGPU driver sets the value of the second synchronization flag bit to the second value. The value of the second synchronization flag bit being the second value may be used to indicate the vGPU in the virtual machine to parse the first rendering frame. Optionally, the vGPU driver may further set the value of the first synchronization flag bit to a non-first-value.

In the foregoing embodiment, the first value of the first synchronization flag bit may be 1, and the second value of the second synchronization flag bit may be 1. If the vGPU driver reads that the value of the first synchronization flag bit is not the first value, that is, the first synchronization flag bit is 0, the vGPU driver does not generate the first rendering frame, or the vGPU driver may perform another task and wait until the value of the first synchronization flag bit is set to 1.

For example, as shown in FIG. 3, the first synchronization flag bit is the flag 2, and the second synchronization flag bit is the flag 1. In Step 101, the vGPU driver may read the flag 2. If a value of the flag 2 in this case is 1 (that is, the value of the first synchronization flag bit is the first value), then optionally, the vGPU driver may set the flag 1 to 0, that is, set the second value to a non-first-value. The vGPU driver may further generate the first rendering frame, and after generating the first rendering frame, the vGPU driver sets the flag 1 to 1, that is, sets the value of the second synchronization flag bit to the second value. The vGPU driver may output the generated first rendering frame to the vGPU.

For another example, as shown in FIG. 3, if the vGPU driver reads that the value of the flag 2 is 0 (that is, the value of the first synchronization flag bit is not the first value), after reading the flag 2, the vGPU driver performs a process of generating the first rendering frame. In this process, the vGPU driver waits until the value of the flag 2 is set to 1, that is, waits until synchronous rendering is completed, and then generates the first rendering frame. Therefore, operation of the virtual machine is temporarily not interrupted. When the vGPU driver reads that the value of the flag 2 is 1, the vGPU driver ends waiting and generates the first rendering frame. For details, see the foregoing descriptions.

Step 103: When the value of the second synchronization flag bit is the second value, synchronously render the first rendering frame, and set the value of the first synchronization flag bit to the first value after the synchronous rendering is completed.

In a possible embodiment, Step 103 may be performed by the vGPU. The vGPU driver generates the first rendering frame, and may output the first rendering frame to the vGPU.

In a possible embodiment, the vGPU may receive the first rendering frame, and may read the value of the second synchronization flag bit. If the vGPU reads that the value of the second synchronization flag bit is the second value, the vGPU parses the first rendering frame and performs synchronous rendering, and the vGPU sets the value of the first synchronization flag bit to the first value. The value of the first synchronization flag bit being the first value may be used to indicate the vGPU driver in the virtual machine to generate a next rendering frame. Optionally, the vGPU may further set the value of the second synchronization flag bit to a non-second-value.

In a possible embodiment, the vGPU reads that the value of the second synchronization flag bit is not the second value. In this case, the vGPU does not parse the first rendering frame, and the vGPU waits until the value of the second synchronization flag bit is set to the second value.

For example, the vGPU may read the flag 1 shown in FIG. 3. If a value of the flag 1 in this case is 1 (that is, the value of the second synchronization flag bit is the second value), optionally, the vGPU may set the flag 2 to 0, that is, set the value of the first synchronization flag bit to a non-first-value. If the value of the flag 1 is 1, the vGPU may further parse the first rendering frame and perform synchronous rendering, and after completing synchronous rendering based on the first rendering frame, the vGPU sets the flag 2 to 1 (that is, sets the value of the first synchronization flag bit to the first value). Optionally, the vGPU may further set the value of the second synchronization flag bit to a non-second-value.

For another example, if the vGPU reads that the value of the flag 1 is 0 (that is, the value of the second synchronization flag bit is not the second value), the vGPU does not perform a process of parsing the first rendering frame, in other words, does not need to perform synchronous rendering. In this process, the vGPU waits until the value of the flag 1 is set to 1, that is, waits until the vGPU generates the first rendering frame, and the vGPU does not interrupt operation of the virtual machine. When the vGPU reads that the value of the flag 1 is 1, the vGPU ends waiting, receives the first rendering frame, and parses the first rendering frame.

In a possible embodiment, optionally, the vGPU completes parsing the first rendering frame, in other words, completes synchronous rendering. The vGPU may output a synchronous rendering result to a physical chip.

According to the method shown in FIG. 2, when a value of a first flag bit is a first value, a first device may generate a first rendering frame, and set a value of a second flag bit to a second value. In addition, when the value of the second flag bit is the second value, the first device may perform synchronous rendering, and set the value of the first flag bit to the first value after the synchronous rendering is completed. Therefore, the first device can be prevented from generating a new rendering frame when the synchronous rendering has not been completed, to avoid a rendering error. In this process, the first device only needs to read the values of the first flag bit and the second flag bit without executing an interrupt. Therefore, usage of CPU resources during rendering synchronization can be reduced.

Figure 4:
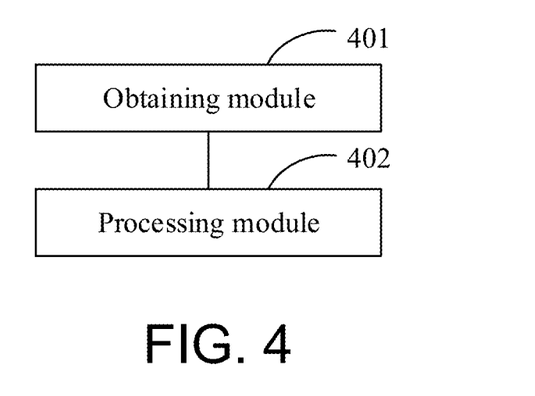
FIG. 4 is a schematic structural diagram of a synchronous rendering apparatus according to an embodiment of this application.

Based on the same technical concept, this application provides an exemplary synchronous rendering apparatus. As shown in FIG. 4, the apparatus includes:
- an obtaining module 401, configured to obtain a value of a first synchronization flag bit and a value of a second synchronization flag bit, where the first synchronization flag bit indicates whether synchronous rendering is completed, and the second synchronization flag bit indicates whether a rendering frame that has not been synchronously rendered exists; and a processing module 402, configured to: when the value of the first synchronization flag bit is a first value, generate a first rendering frame, and set the value of the second synchronization flag bit to a second value; and when the value of the second synchronization flag bit is the second value, synchronously render the first rendering frame, and set the value of the first synchronization flag bit to the first value after the synchronous rendering is completed.

In a possible design, the processing module 402 is further configured to stop generating a rendering frame when the value of the first synchronization flag bit is not the first value.

In a possible design, after generating the first rendering frame, the processing module 402 is further configured to set the value of the first synchronization flag bit not to be the first value.

In a possible design, the processing module 402 is further configured to: when the value of the second synchronization flag bit is not the second value, stop performing synchronous rendering based on a generated rendering frame.

In a possible design, after synchronously rendering the first rendering frame, the processing module 402 is further configured to set the value of the second synchronization flag bit not to be the second value.

Figure 5:
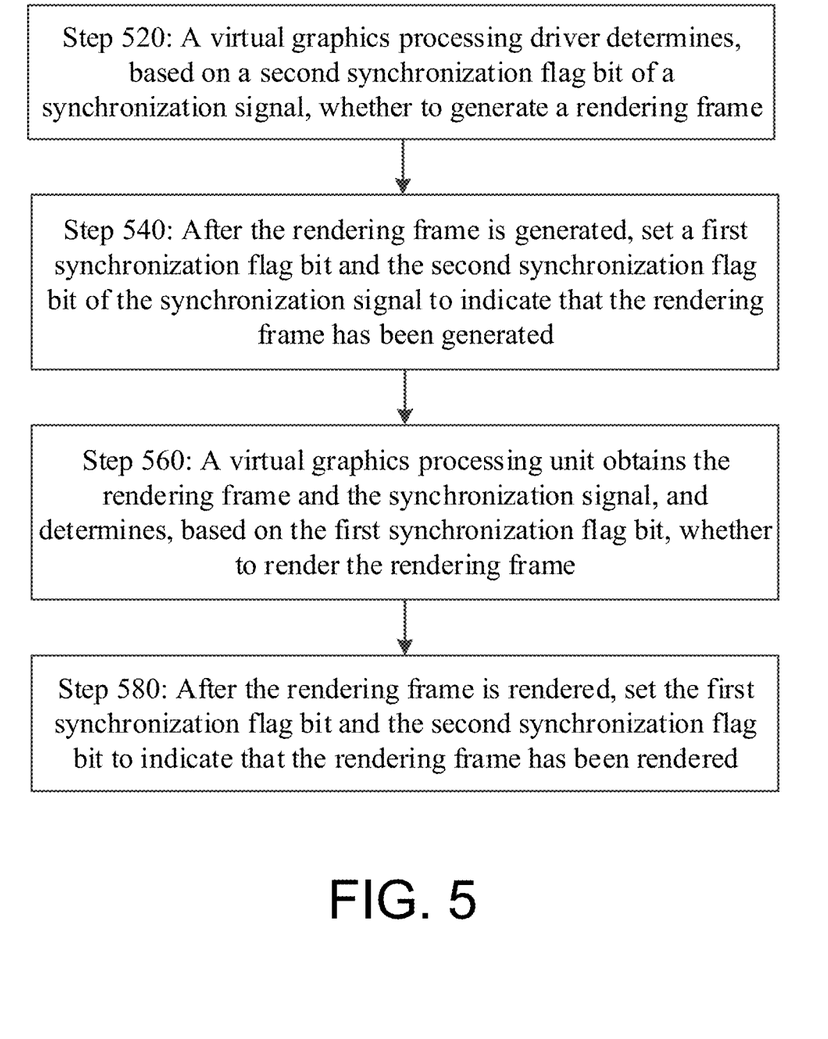
FIG. 5 is a schematic flowchart of a synchronous rendering method according to an embodiment of this application.

As shown in FIG. 5, an exemplary embodiment of this application provides a synchronous rendering method. The method includes the following steps.

Step 520: A virtual graphics processing driver determines, based on a second synchronization flag bit of a synchronization signal, whether to generate a rendering frame.

The virtual graphics processing driver (for example, a vGPU driver) may be configured on a guest of a virtual machine.

The synchronization signal is a signal that is cached or sent to a virtual graphics processing unit (for example, a vGPU device) along with a generated to-be-rendered rendering frame and that is used to implement synchronization between generation of a rendering frame and rendering of a corresponding rendering frame. In this embodiment, the synchronization signal includes at least a first synchronization flag bit and a second synchronization flag bit. The first synchronization flag bit indicates whether the virtual graphics processing unit (namely, a host side) can render a rendering frame. The second synchronization flag bit indicates whether the virtual graphics processing driver (namely, a guest side) can start generation of a rendering frame. In an embodiment shown in FIG. 8, a structure of the synchronization signal is described in more detail as an example. The foregoing vGPU device may be a virtual device in a virtual machine.

Still refer to FIG. 5. The virtual graphics processing driver on the guest may determine, based on a value of the second synchronization flag bit of the synchronization signal, whether a rendering frame needs to be generated, to implement synchronization between generation of a rendering frame and rendering of the rendering frame.

Step 540: After the rendering frame is generated, set the first synchronization flag bit and the second synchronization flag bit of the synchronization signal to indicate that the rendering frame has been generated.

The virtual graphics processing unit may be configured on a host of the virtual machine.

The setting the first synchronization flag bit and the second synchronization flag bit to indicate that the rendering frame has been generated may be: setting the second synchronization flag bit to indicate that a next rendering frame cannot be generated, and setting the first synchronization flag bit to indicate that rendering of a current rendering frame can be started.

In this embodiment, an application at an application layer may initiate a graphics rendering invocation to the virtual graphics processing driver. After receiving a rendering request, the virtual graphics processing driver determines, based on the value of the second synchronization flag bit, whether a rendering frame can be generated, that is, whether generation of a rendering frame meets a synchronization condition. The virtual graphics processing driver generates a rendering frame when determining, based on the value of the second synchronization flag bit, that a rendering frame can be generated.

For example, it may be so configured that when the second synchronization flag bit is a first value, that is, when a rendering frame generation condition is met, the virtual graphics processing driver generates a rendering frame.

After the rendering frame is generated, the first synchronization flag bit and the second synchronization flag bit of the synchronization signal are set correspondingly, so that the virtual graphics processing driver stops generating a subsequent rendering frame and allows the virtual graphics processing unit to start rendering of the rendering frame, thereby realizing synchronization between generation and rendering of a rendering frame.

For example, it may be so configured that after the rendering frame is generated, the second synchronization flag bit is set to a second value, and the first synchronization flag bit is set to a fourth value. The second value and the fourth value may be the same or different. A manner of setting the first synchronization flag bit and the second synchronization flag bit is described in the following exemplary embodiments.

Specifically, in an embodiment, the virtual graphics processing unit can start rendering of a rendering frame when the first synchronization flag bit is 1, the virtual graphics processing unit cannot start rendering of a rendering frame when the first synchronization flag bit is 0, the virtual graphics processing driver can generate a rendering frame when the second synchronization flag bit is 1, and the virtual graphics processing driver cannot generate a rendering frame when the second synchronization flag bit is 0.

An initial value of the first synchronization flag bit may be 0, and an initial value of the second synchronization flag bit may be 1.

When the virtual graphics processing driver receives a graphics rendering request sent by an application, the virtual graphics processing driver reads the second synchronization flag bit. Because the initial value of the second synchronization flag bit is 1, the virtual graphics processing driver generates a rendering frame, and changes the value of the second synchronization flag bit to 0 after the rendering frame is generated. In this case, the value of the first synchronization flag bit is changed to 1.

After the synchronization signal including the first synchronization flag bit and the second synchronization flag bit is inserted in the rendering frame, the virtual graphics processing unit reads the first synchronization flag bit. Because the value of the first synchronization flag bit is 1, the virtual graphics processing unit can start rendering of the rendering frame. The virtual graphics processing unit starts rendering of the rendering frame, and changes the value of the first synchronization flag bit to 0 after a physical GPU completes rendering of the rendering frame. In this case, the value of the second synchronization flag bit is changed to 1. In this case, because the value of the second synchronization flag bit is 1, the virtual graphics processing driver may continue to generate a next rendering frame after reading that the second synchronization flag bit is 1, and so on. In this way, synchronization between generation and rendering of a rendering frame is implemented.

Step 560: The virtual graphics processing unit obtains the rendering frame and the synchronization signal, and determines, based on the first synchronization flag bit, whether to render the rendering frame.

In this embodiment, after generating the rendering frame, the virtual graphics processing driver inserts the synchronization signal, and buffers the rendering frame and the synchronization signal or sends the rendering frame and the synchronization signal to the virtual graphics processing unit for rendering the rendering frame.

Step 580: After the rendering frame is rendered, set the first synchronization flag bit and the second synchronization flag bit to indicate that the rendering frame has been rendered.

The setting the first synchronization flag bit and the second synchronization flag bit to indicate that the rendering frame has been rendered may be: setting the second synchronization flag bit to indicate that a next rendering frame can be generated, and setting the first synchronization flag bit to indicate that rendering of the next rendering frame cannot be started.

In this embodiment, after receiving the synchronization signal, the virtual graphics processing unit may determine, based on the setting of the first synchronization flag bit, whether to start rendering. A process of starting, by the virtual graphics processing unit, rendering of the rendering frame is described in detail in the following embodiments.

For example, it may be so configured that when the first synchronization flag bit is a third value, that is, when a condition for the virtual graphics processing unit to start rendering of the rendering frame is met, the virtual graphics processing unit starts rendering.

In this embodiment, after the rendering frame is rendered, the first synchronization flag bit and the second synchronization flag bit are set correspondingly, and an updated first synchronization flag bit is transmitted back to the virtual graphics processing driver to implement synchronization between generation and rendering of the rendering frame.

For example, it may be so configured that after the rendering frame is rendered, the first synchronization flag bit is set to the third value, and the second synchronization flag bit is set to the first value. The third value may be an opposite value of the fourth value. For example, the third value is 0, and the fourth value is 1; or the third value is 1, and the fourth value is 0. The second value may be an opposite value of the first value. For example, the first value and the third value may be the same or different.

In this embodiment, the first synchronization flag bit and the second synchronization flag bit in the synchronization signal are set based on generation of a rendering frame and rendering of the rendering frame, and synchronization between the virtual graphics processing driver and the virtual graphics processing unit (also referred to as a virtual graphics processing unit device) is ensured based on the settings of the first synchronization flag bit and the second synchronization flag bit. This avoids a need to execute an interrupt wait in the virtual machine for synchronization between the virtual graphics processing driver and the virtual graphics processing unit, and synchronization between the virtual graphics processing driver and the virtual graphics processing unit can be implemented by reading and writing values of the first synchronization flag bit and the second synchronization flag bit. This reduces usage of CPU resources during synchronous rendering.

Figure 6:
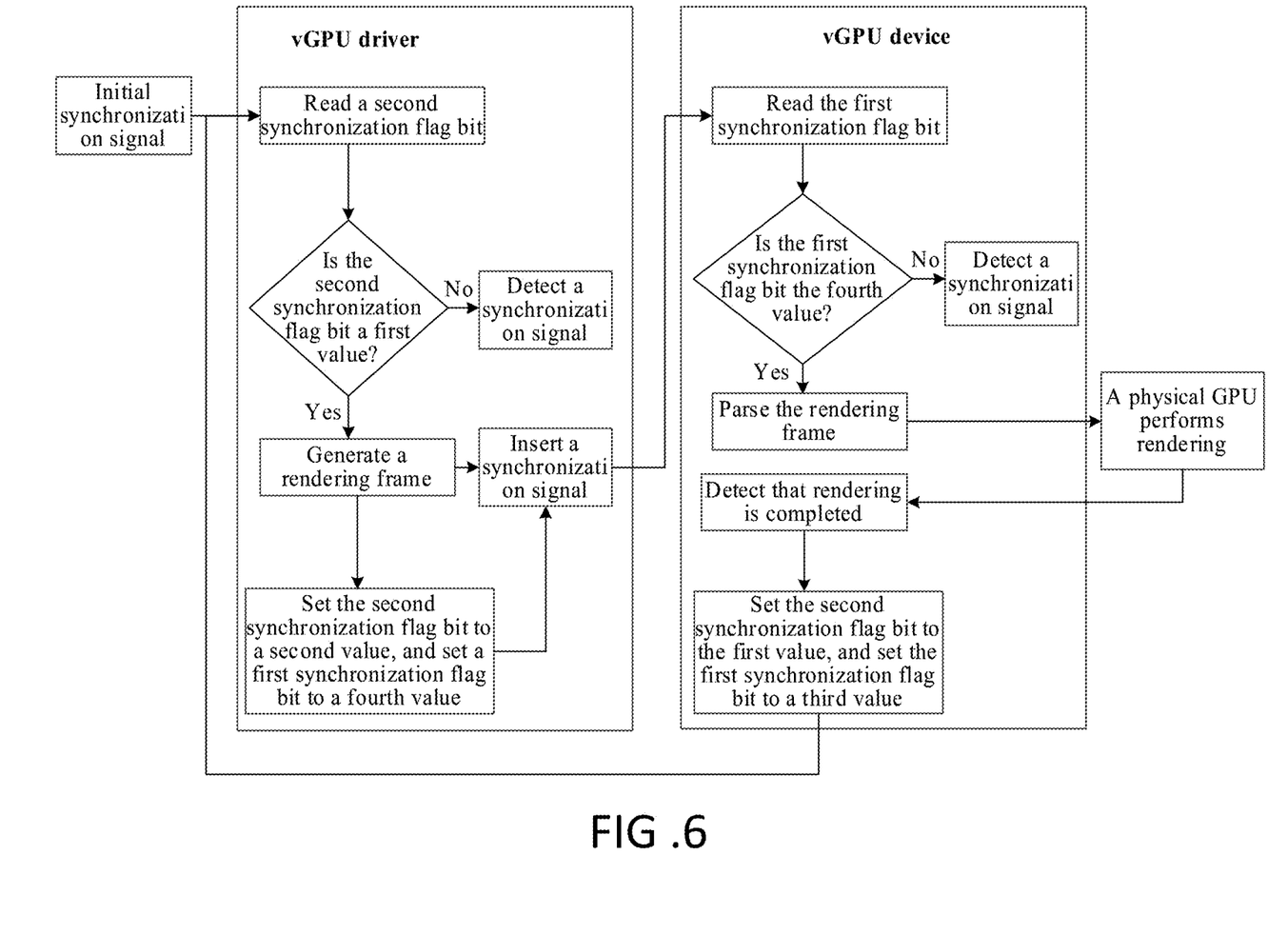
FIG. 6 is a schematic flowchart of a synchronous rendering method according to an embodiment of this application.

As shown in FIG. 6, an exemplary embodiment of this application provides a synchronous rendering method.

In this embodiment, the synchronous rendering method is applied to a virtual machine architecture. A vGPU driver (namely, a virtual graphics processing driver) is configured on a guest side, and a vGPU device (namely, a virtual graphics processing unit) is configured on a host side.

The vGPU driver reads a first synchronization flag bit after receiving a graphics rendering request from an application (for example, an application (APP)) at an application layer. When the first synchronization flag bit is a first value (for example, 1), the vGPU driver generates a rendering frame.

In this embodiment, in addition, when a second synchronization flag bit is a second value (for example, 0), the vGPU driver does not generate a rendering frame, but detects the second synchronization flag bit in a synchronization signal. A detection manner may be: periodically reading the second synchronization flag bit. A detection periodicity may be 1 microsecond, 1 millisecond, 1 second, or the like. This is not particularly limited in this embodiment of this application. The vGPU driver generates a rendering frame when detecting that the second synchronization flag bit is the first value.

When the vGPU driver is detecting the second synchronization flag bit, the vGPU driver may enter a sleep mode or perform another task.

In this embodiment, the vGPU driver detects the second synchronization flag bit, so that synchronization between generation of a rendering frame and rendering of the rendering frame can be ensured without interrupting a virtual machine system. This reduces usage of CPU resources during synchronous rendering.

It can be understood that, in other embodiments, when the vGPU driver reads that the second synchronization flag bit is the second value, the vGPU driver may alternatively not keep detecting the second synchronization flag bit, but trigger reading of the second synchronization flag bit again in another manner, for example, waiting for an application to initiate a graphics rendering request again.

After the rendering frame is generated, the first synchronization flag bit is set to a fourth value (for example, 1), and the second synchronization flag bit is set to the second value (for example, 0). A synchronization signal including an adjusted first synchronization flag bit and second synchronization flag bit is inserted in the generated rendering frame, and the rendering frame and the synchronization signal are buffered or sent to the vGPU device for subsequently parsing and rendering the rendering frame.

In this embodiment, the first synchronization flag bit is only readable to the vGPU driver, and is readable and writable to the vGPU device. The second synchronization flag bit is only readable to the vGPU device, and is readable and writable to the vGPU driver. It can be understood that readability of the first synchronization flag bit and the second synchronization flag bit may alternatively be other settings, provided that after the rendering frame is generated, the first synchronization flag bit and the second synchronization flag bit can be set to enable the vGPU device to synchronously start rendering of the rendering frame.

In this embodiment, after the rendering frame is generated, the vGPU driver sets the second synchronization flag bit to the second value, and the first synchronization flag bit is set to the fourth value by using a bit reversal or bit association technology when the second synchronization flag bit is set to the second value. In this way, a corresponding setting of the first synchronization flag bit is triggered by relying only on a write operation performed by the vGPU driver on the second synchronization flag bit. This simplifies operations for the two synchronization flag bits and improves accuracy. It can be understood that operations for the two synchronization flag bits may alternatively implemented in another manner. For example, the vGPU driver notifies the vGPU device after performing a write operation on the second synchronization flag bit, and then the vGPU device performs a write operation on the first synchronization flag bit.

Still as shown in FIG. 6, the synchronization signal is inserted in the generated rendering frame, and the vGPU driver buffers the rendering frame and the synchronization signal or sends the rendering frame and the synchronization signal to the vGPU device. After receiving the rendering frame and the synchronization signal, the vGPU device reads the first synchronization flag bit in the synchronization signal.

When the first synchronization flag bit is the fourth value (for example, 1), the vGPU device starts a rendering process for the rendering frame.

Specifically, in this embodiment, the vGPU device parses the rendering frame and sends a parsed rendering frame to a physical virtual graphics processing unit (namely, a physical GPU).

The vGPU device may detect a rendering result of the physical GPU. When detecting that rendering performed by the physical GPU is completed, the vGPU device sets the first synchronization flag bit to a third value (for example, 0), and sets the second synchronization flag bit to the first value (for example, 1). A manner of setting the first synchronization flag bit and the second synchronization flag bit is similar to that in the preceding embodiments. Details are not described herein again.

The vGPU device transmits, back to the vGPU driver, the synchronization signal in which the synchronization flag bits are reset. The vGPU driver determines, based on the second flag bit of the synchronization signal, whether to generate a next rendering frame. In this way, synchronization between generation and rendering of the rendering frame is implemented.

In another embodiment, in addition, after parsing the rendering frame, the vGPU device detects whether the physical GPU is in an idle state, that is, whether the physical GPU is currently processing another task. When detecting that the physical GPU is in an idle state, the vGPU device sends the rendering frame to the physical GPU for rendering.

When the vGPU device detects that the physical GPU is not in an idle state, the vGPU device waits until the physical GPU completes an ongoing processing task. When the physical GPU completes the ongoing processing task, the vGPU device then sends a to-be-processed rendering frame to the physical GPU for rendering.

In another embodiment, in addition, the vGPU device keeps detecting the value of the first synchronization flag bit in the synchronization signal while waiting for the physical GPU to complete the ongoing processing task. When the value of the first synchronization flag bit is the third value, the vGPU device stops starting rendering of the rendering frame.

Figure 7:
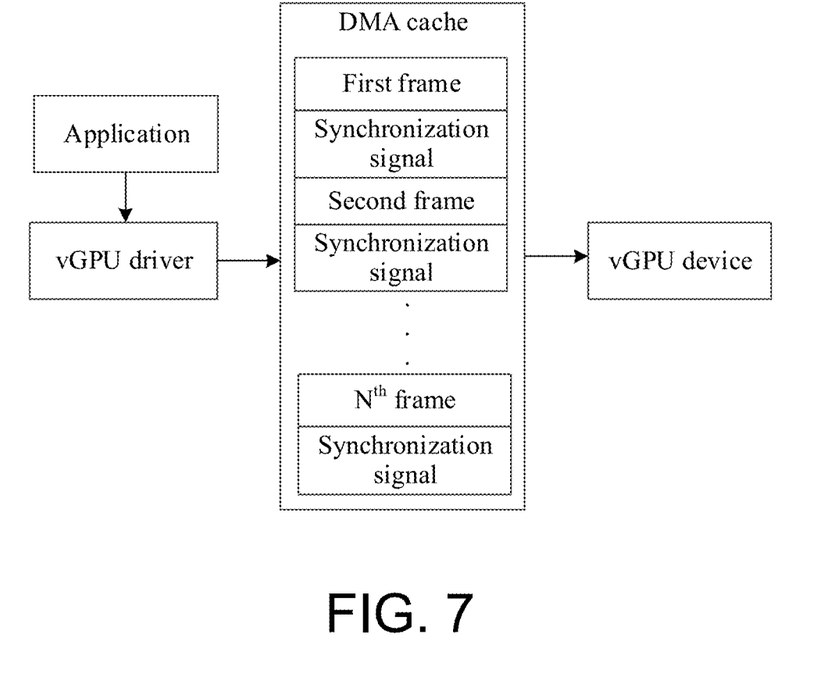
FIG. 7 is a schematic diagram of a process of processing a rendering frame and a synchronization signal in a synchronous rendering method according to an embodiment of this application.

FIG. 7 is a schematic diagram of a process of processing a rendering frame and a synchronization signal in a synchronous rendering method.

In this embodiment, a vGPU driver generates a plurality of rendering frames in response to a rendering request of an application, and inserts a corresponding synchronization signal after each rendering frame. The corresponding synchronization signal includes a corresponding first synchronization flag bit and second synchronization flag bit. The vGPU driver caches, to a cache (for example, DMA cache) device, a plurality of rendering frames (for example, a first frame and a second frame) in which a synchronization signal is inserted. A vGPU device extracts a rendering frame from the direct memory access (DMA) cache, and reads a corresponding second synchronization flag bit to start rendering of the rendering frame. A process of synchronizing, by the vGPU driver and the vGPU device, generation and rendering of a rendering frame based on a first synchronization flag bit and a second synchronization flag bit is described in the foregoing exemplary embodiments. Details are not described herein again. It can be understood that, although the DMA cache is used in this embodiment, other types of caches may alternatively be used in other embodiments.

A cache for caching a plurality of rendering frames and corresponding synchronization signals is configured, so that the vGPU driver and the vGPU device can simultaneously synchronize generation and rendering of a plurality of rendering frames. This improves rendering efficiency and reduces CPU usage during rendering synchronization.

Figure 8:
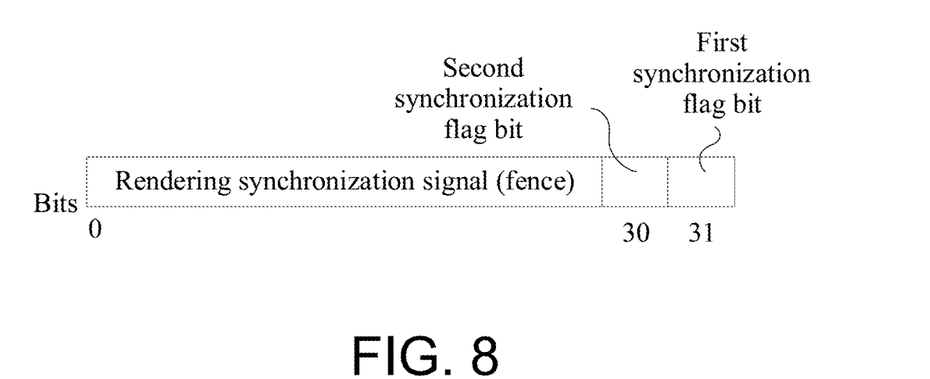
FIG. 8 is a schematic structural diagram of a synchronization signal according to an embodiment of this application.

FIG. 8 is a schematic structural diagram of a synchronization signal according to an embodiment of this application.

In this embodiment, the synchronization signal has a length of 32 bits. It can be understood that the synchronization signal may alternatively have another length, for example, 2 bits, 8 bits, or 64 bits.

In this embodiment, the synchronization signal includes a rendering synchronization frame (fence). The rendering synchronization frame is used to space rendering frames.

In another embodiment, the synchronization signal may alternatively not include a rendering synchronization frame (fence). In this case, a first synchronization flag bit and a second synchronization flag bit are inserted between rendering frames without insertion of an additional rendering synchronization frame (fence). This reduces frame overheads while ensuring synchronization between generation of a rendering frame and rendering of the rendering frame.

As shown in the figure, the first synchronization flag bit and the second synchronization flag bit are set at the last two bits of the rendering synchronization frame. It can be understood that the first synchronization flag bit and the second synchronization flag bit may alternatively be set at other locations in the synchronization signal. This is not particularly limited in this application.

Figure 9:
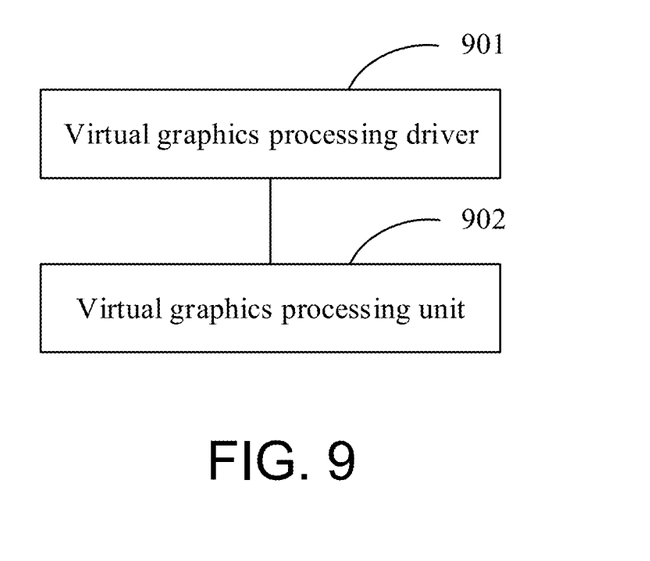
FIG. 9 is a schematic structural diagram of a synchronous rendering apparatus according to an embodiment of this application.

As shown in FIG. 9, an exemplary embodiment of this application provides a synchronous rendering apparatus, including:
- a virtual graphics processing driver 901, configured to: determine, based on a second synchronization flag bit of a synchronization signal, whether to generate a rendering frame, and after the rendering frame is generated, set a first synchronization flag bit and the second synchronization flag bit of the synchronization signal to indicate that the rendering frame has been generated; and a virtual graphics processing unit 902, configured to: obtain the rendering frame and the synchronization signal, and after the rendering frame is rendered, set the first synchronization flag bit and the second synchronization flag bit to indicate that the rendering frame has been rendered.

It can be understood that the synchronous rendering apparatus shown in the embodiment of FIG. 9 may be configured to perform the steps of the synchronous rendering method in the foregoing exemplary embodiments. Details are not described herein again.

Figure 10:
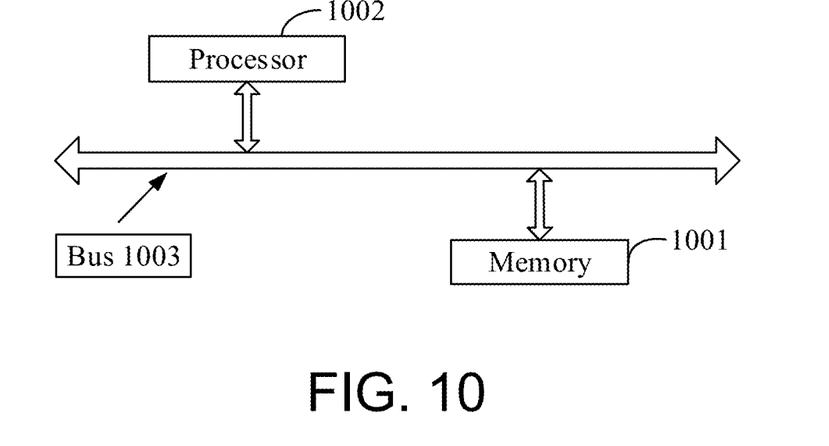
FIG. 10 is a schematic diagram of an internal structure of an electronic device according to an embodiment of this application.

Based on an inventive concept same as that of the foregoing method embodiments, an embodiment of this application further provides an electronic device. The electronic device may be configured to perform the actions in the foregoing method embodiments. In this embodiment, a structure of the electronic device may include a memory 1001 and one or more processors 1002, as shown in FIG. 10.

The memory 1001 is configured to store a computer program to be executed by the processor 1002. The memory 1001 may mainly include a program storage area and a data storage area. The program storage area may store an operating system, a program required for running an instant messaging function, and the like. The data storage area may store various types of instant messaging information, operation instruction sets, and the like.

The memory 1001 may be a volatile memory, for example, a random access memory (RAM); or the memory 1001 may be a non-volatile memory, for example, a read-only memory, a flash memory, a hard disk drive (HDD), or a solid-state drive (SSD); or the memory 1001 is any other medium that can be used to carry or store expected program code in a form of an instruction or a data structure and that can be accessed by a computer, but is not limited thereto. The memory 1001 may be a combination of the foregoing memories.

The processor 1002 may include one or more central processing units (CPU), or is a digital processing unit, or the like. The processor 1002 is configured to implement the foregoing method when invoking a computer program stored in the memory 1001.

A specific connection medium between the memory 1001 and the processor 1002 is not limited in this embodiment of this application. In an example, in this embodiment of this application, in FIG. 10, the memory 1001 and the processor 1002 are connected through a bus 1003. The bus 1003 is represented by a bold line in FIG. 10. A connection manner between other components is described merely as an example and does not constitute a limitation. The bus 1003 may be categorized as an address bus, a data bus, a control bus, or the like. For ease of representation, only one bold line is used to represent the bus in FIG. 10, but this does not mean that there is only one bus or only one type of bus.

Optionally, the processor 1002 may be configured to perform an action performed by any one or more of the obtaining module 401 and the processing module 402.

According to an aspect of this application, a computer program product or a computer program is provided. The computer program product or the computer program includes computer instructions. The computer instructions are stored in a computer-readable storage medium. A processor of a computer device reads the computer instructions from the computer-readable storage medium, and the processor executes the computer instructions, so that the computer device performs the method in the foregoing embodiments.

The computer product may be one readable medium or any combination of a plurality of readable media. The readable medium may be a readable signal medium or a readable storage medium. For example, the readable storage medium may be but is not limited to an electrical, magnetic, optical, electromagnetic, infrared, or semiconductor system, apparatus, or device, or any combination thereof. More specific examples (a non-exhaustive list) of the readable storage medium include an electrical connection including one or more wires, a portable disk, a hard disk drive, a random access memory (RAM), a read-only memory (ROM), an erasable programmable read-only memory (an erasable programmable read-only memory (EPROM) or a flash memory), an optical fiber, a portable compact disc read-only memory (CD-ROM), an optical storage device, a magnetic storage device, or any suitable combination thereof.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A synchronous rendering method, comprising:
    determining, by a virtual graphics processing driver based on a second synchronization flag bit of a synchronization signal, whether to generate a rendering frame;
    generating, when the second synchronization flag bit is a first value, the rendering frame;
    after the rendering frame is generated, setting a first synchronization flag bit and the second synchronization flag bit of the synchronization signal to indicate that the rendering frame has been generated;
    obtaining, by a virtual graphics processing unit, the rendering frame and the synchronization signal, and determining, based on the first synchronization flag bit, whether to render the rendering frame; and rendering, when the first synchronization flag bit is a fourth value, the rendering frame;

after the rendering frame is rendered, setting the first synchronization flag bit and the second synchronization flag bit to indicate that the rendering frame has been rendered.

2. The method according to claim 1, wherein before the determining, by the virtual graphics processing driver based on the second synchronization flag bit of the synchronization signal, whether to generate the rendering frame, the method further comprises:

setting the second synchronization flag bit to the first value.

3. The method according to claim 2, wherein the after the rendering frame is generated, setting the first synchronization flag bit and the second synchronization flag bit of the synchronization signal to indicate that the rendering frame has been generated comprises:

after the rendering frame is generated, setting the second synchronization flag bit to a second value, and setting the first synchronization flag bit to the fourth value.

4. The method according to claim 2, wherein the determining, by the virtual graphics processing driver based on the second synchronization flag bit of the synchronization signal, whether to generate the rendering frame further comprises:

when the second synchronization flag bit is a second value, entering, by the virtual graphics processing driver, a sleep state, or processing another task.

5. The method according to claim 4, wherein the determining, by the virtual graphics processing driver based on the second synchronization flag bit of the synchronization signal, whether to generate the rendering frame further comprises:

when the second synchronization flag bit is the second value, detecting, by the virtual graphics processing driver, the second synchronization flag bit of the synchronization signal.

6. The method according to claim 2, wherein before the determining, by the virtual graphics processing driver based on the second synchronization flag bit of the synchronization signal, whether to generate the rendering frame, the method further comprises:

setting the first synchronization flag bit to a third value; and the method further comprises:

after the rendering frame is generated, setting the first synchronization flag bit to the fourth-value.

7. The method according to claim 6, wherein the rendering the rendering frame when the first synchronization flag bit is the fourth value comprises:

parsing the rendering frame; and sending the rendering frame to a physical graphics processing unit for rendering.

8. The method according to claim 7, wherein before the sending the rendering frame to the physical graphics processing unit for rendering, the rendering the rendering frame when the first synchronization flag bit is the fourth value further comprises:

determining whether the physical graphics processing unit is idle; and the sending the rendering frame to the physical graphics processing unit for rendering comprises:

when the physical graphics processing unit is idle, sending the rendering frame to the physical graphics processing unit for rendering.

9. The method according to claim 8, wherein the sending the rendering frame to a physical graphics processing unit for rendering further comprises:

when the physical graphics processing unit is not idle, detecting, by the virtual graphics processing unit, the first synchronization flag bit.

10. The method according to claim 1, wherein the after the rendering frame is rendered, setting the first synchronization flag bit and the second synchronization flag bit to indicate that the rendering frame has been rendered comprises:

setting the first synchronization flag bit to a third value, and setting the second synchronization flag bit to the first value.

11. The method according to claim 1, wherein the determining, by the virtual graphics processing unit based on the first synchronization flag bit of the synchronization signal, whether to render the rendering frame further comprises:

when the first synchronization flag bit is a third value, entering, by the virtual graphics processing unit, a sleep state, or processing another task.

12. The method according to claim 11, wherein the determining, by the virtual graphics processing unit based on the first synchronization flag bit of the synchronization signal, whether to render the rendering frame further comprises:

when the first synchronization flag bit is the third value, detecting, by the virtual graphics processing unit, the first synchronization flag bit of the synchronization signal.

13. The method according to claim 1, wherein the synchronization signal does not comprise a rendering synchronization frame.

14. The method according to claim 1, wherein the synchronization signal comprises a rendering synchronization frame, and the first synchronization flag bit and the second synchronization flag bit are set at the last two bits of the rendering synchronization frame.

15. The method according to claim 1, wherein the first synchronization flag bit is configured to be readable and writable to the virtual graphics processing unit and only readable to the virtual graphics processing driver; and/or the second synchronization flag bit is configured to be readable and writable to the virtual graphics processing driver and only readable to the virtual graphics processing unit.

16. The method according to claim 15, wherein the first synchronization flag bit and the second synchronization flag bit are able to be set through bit reversal and bit association.

17. An electronic device, comprising:

a memory, wherein the memory stores program code; and a processor, configured to: when the program code is executed by the processor, perform the steps of the method according to claim 1.

18. A non-transitory computer-readable storage medium, comprising program code, wherein when the program code is run on an electronic device, the program code is used to enable the electronic device to perform the steps of the method according to claim 1.

* * * * *